(12) United States Patent
Marsa et al.

(10) Patent No.: US 8,533,825 B1
(45) Date of Patent: Sep. 10, 2013

(54) SYSTEM, METHOD AND COMPUTER PROGRAM PRODUCT FOR COLLUSION DETECTION

(75) Inventors: Robert Lee Marsa, Round Rock, TX (US); Srinivas Rao Doddi, Fremont, CA (US)

(73) Assignee: Adometry, Inc., Austin, TX (US)

( * ) Notice: Subject to any disclaimer, the term of this patent is extended or adjusted under 35 U.S.C. 154(b) by 331 days.

(21) Appl. No.: 12/700,053

(22) Filed: Feb. 4, 2010

(51) Int. Cl.
*H04L 29/06* (2006.01)

(52) U.S. Cl.
USPC .............................................. 726/22; 726/26

(58) Field of Classification Search
USPC .......................................................... 726/22
See application file for complete search history.

(56) References Cited

U.S. PATENT DOCUMENTS

| | | | |
|---|---|---|---|
| 6,381,628 B1 * | 4/2002 | Hunt .............................. | 709/201 |
| 6,714,975 B1 * | 3/2004 | Aggarwal et al. ............. | 709/224 |
| 7,657,626 B1 * | 2/2010 | Zwicky .......................... | 709/224 |
| 8,015,190 B1 | 9/2011 | Bayardo et al. | |
| 8,190,592 B1 | 5/2012 | Bayardo et al. | |
| 2006/0212350 A1 | 9/2006 | Ellis et al. | |
| 2008/0243637 A1 * | 10/2008 | Chan et al. ...................... | 705/27 |
| 2008/0270154 A1 | 10/2008 | Klots et al. | |
| 2009/0157417 A1 | 6/2009 | Bradley et al. | |

OTHER PUBLICATIONS

Mehmed et al. Pub 2008—Improving Click Fraud Detection by Real Time Data Fusion Mehmed et al.—University of Louisville Publication 2005—Collaborative Click Fraud Detection and Prevention System CCFDP.*
Mehmed et al. IEEE Pub 2008—Improving Click Fraud Detection by Real Time Data Fusion.*
Conrad et al.—University of Heinrich-Heine Pub 2008—Partitioning Massive Graphs for Content Oriented Social Network Analysis.*
Abramson, Craig and Kistler, Kenny, "Managing Click-Stream Data," Syncsort Incorporated, Woodcliff Lake, NJ, printed on Jan. 14, 2010 from URL://http://www.syncsort.com, 16 pgs.
Office Action for U.S. Appl. No. 12/797,904, mailed Mar. 13, 2013, 14 pgs.
Metwally, Ahmed et al., Using Association Rules for Fraud Detection in Web Advertising Networks, University of California, Santa Barbara, CA, IEEE, 2007, 14 pgs.
Metwally, Ahmed et al., on Hit Inflation Techniques and Detection in Streams of Web Advertising Networks, 27th Int'l Conf. on Distributed Computing Systems, 2007, IEEE 0-7695-2837-3, 2007, 8 pgs.
Notice of Allowance for U.S. Appl. No. 12/797,904, mailed Jul. 10, 2013, 6 pgs.

* cited by examiner

*Primary Examiner* — Jung Kim
*Assistant Examiner* — Tri Tran
(74) *Attorney, Agent, or Firm* — Sprinkle IP Law Group

(57) ABSTRACT

Embodiments disclosed herein provide a practical solution for click fraud detection. One embodiment of a method may comprise constructing representations of entities via a graph network framework. The representations, graphs or vector spaces, may capture information pertaining to clicks by botnets/click farms. To detect click fraud, each representation may be analyzed in the context of clustering, resulting in large data sets with respect to time, frequency, or gap between clicks. Highly accurate and highly scalable heuristics may be developed/applied to identify IP addresses that indicate potential collusion. One embodiment of a system having a computer program product implementing such a click fraud detection method may operate to receive a client file containing clicks gathered at the client side, construct representations of entities utilizing the graph framework described herein, perform clustering on the representations thus constructed, identify IP addresses of interest, and return a list containing same to the client.

21 Claims, 6 Drawing Sheets

SYSTEM, METHOD AND COMPUTER PROGRAM PRODUCT FOR COLLUSION DETECTION

TECHNICAL FIELD OF THE DISCLOSURE

The present disclosure relates generally to detecting various types of click fraud and, more particularly, to a system, method, and computer program product for modeling detection of various types of click fraud.

BACKGROUND OF THE DISCLOSURE

Pay per click advertising is an arrangement in which operators of Web sites, acting as publishers, display clickable links from advertisers in exchange for a charge per click. Cost per click (CPC) advertising is a growing part of the online advertising market. Advertisers using the CPC model pay for each ad click. If the ad clicks are fraudulent, they can lose a substantial amount of money.

Recently, click fraud detection has become a growing concern. It is becoming an increasing problem due to the fact that people committing click fraud can make large sums of money. Every day, fraudsters are coming up with innovative schemes to monetize it.

Click fraud can occur in various ways and can be broadly classified into two types: 1) publisher fraud and 2) competitor fraud. Publisher fraud is when an online publisher or someone associated with the publisher generates as many clicks as possible on a Web site operated by the publisher. This is motivated by the fact that the publisher gets paid each time someone clicks on an ad, whether that click is valid or not. Competitor fraud is not motivated by making money on the clicks but rather in making the competitor pay for clicks that are useless to them. Clicking on a competitor's ads can cause their budget to be exhausted so there are no ads left to serve to legitimate users.

Although the incentives in both types of click fraud may be different, the underlying techniques employed to commit fraud are very similar. Intuitively, fraudsters distribute their traffic to multiple entities to mimic normal traffic and thus evade fraud detection. This type of activity is known as collusion. Either type of fraud may enlist the aid of botnets or click farms to generate clicks, i.e., to click on paid search ads. A botnet or robot network is a group of computers running a computer application—a software robot—controlled and manipulated by the owner or the software source. Botnets can be programmed to run autonomously and automatically to click on online ads. In the case of click farms, humans are enlisted to click on ads.

Detecting collusion fraud is much more difficult than detecting click fraud by a single entity for several reasons. The fraudulent clicks may be spread across dozens or hundreds of sites and may be generated from numerous different IP addresses, making any possible detection computationally expensive and time consuming.

In general, application of ad hoc techniques is not practical as fraudsters constantly change their ways. A practical solution is needed to detect various types of click fraud. The present disclosure can address this need and more.

SUMMARY OF THE DISCLOSURE

Embodiments disclosed herein provide sophisticated and scalable online fraud detection techniques that can be easily extended or otherwise adapted to detect various types of collusion fraud. One technique disclosed herein focuses on detecting collusion involving various types of publisher fraud and competitor fraud. The term "collusion" refers to an organized activity in which groups of visitors click on groups of ads. Examples may include, but are not limited to: botnets, a group of referrers or publishers involved in a scheme, auto-clicking, clicking on competitors' sites, etc.

Computationally, collusion detection may involve exploring a large number of subgroups. To address this issue, in some embodiments, collusion detection may be modeled as solving a clustering problem in networks (or graphs) as well as vector spaces. Modeling various types of click fraud as clustering in networks (or graphs) or clustering in high dimensional vector spaces allows embodiments disclosed herein to be useful in capturing many types of fraud, making this a versatile and practical solution.

Examples disclosed herein show how to model various types of collusion in the frameworks of a network analysis or a vector space analysis. Specifically, examples disclosed herein show:

1) How to construct representations that preserve important information relevant to click fraud: (i) graphs or networks and (ii) vectors (arrays of real numbers) that capture the right information necessary for various types of fraud.
2) How to model the detection of collusion in publisher fraud and competitor fraud as clustering problems, including the detection of botnets or click farms.
3) Type of clustering methods that are highly efficient and scalable for detecting collusion.

In some embodiments, a method for modeling collusion detection may be implemented at a server computer in an enterprise computing environment. Embodiments disclosed herein include a system and a computer program product implementing the method. In some embodiments, the method may comprise receiving historical click data from a client computer connected to the enterprise computing environment over a network. In some embodiments, the historical click data may comprise a plurality of clicks generated over a period of time and information associated with the plurality of clicks.

In some embodiments, the historical click data may be collected by the client computer. In some embodiments, the client computer may be a server machine residing at the client site, in the client's computing environment or network. In some embodiments, the client computer may collect click streams associated with visitors to one or more Web sites owned and/or operated by the client. The collected information may be stored in one or more log files. In some embodiments, the client's one or more log files may contain the historical click data. In some embodiments, the information associated with the plurality of clicks may comprise visitor Internet Protocol (IP) address information, date and time information, publisher information, referrer information, user-agent information, searched keywords, cookie, and so on.

In some embodiments, software running on the server computer may extract entities from the historical click data. In some embodiments, the extracted entities are utilized to formulate potential collusion among the entities as a network problem, a vector space problem, or a combination thereof.

In some embodiments, formulating potential collusion among the entities as a network problem may comprise constructing network representations of the entities and their relationships, partitioning the network representations into subgroups of nodes to maximize a number of connections between the nodes in each subgroup, and forwarding the subgroups to a network analyzer for producing a first set of potentially colluding entities. In some embodiments, constructing network representations of the entities and their relationships may further comprise utilizing nodes to represent the entities and utilizing connections between the nodes to represent the relationships between the entities. In some embodiments, the network representations are constructed in accordance with a set of rules that include definitions of entity relationships with respect to collusion detection.

In some embodiments, the method may further comprise solving the network problem utilizing a metric, a mathematical function, or an algorithm. In some embodiments, the metric is utilized to determine a density of each subgroup, wherein the density of the subgroup is defined by the number of connections in the subgroup divided by the number of nodes in the subgroup, and wherein the density of the subgroup corresponds to a degree of collusion of the entities represented by the nodes in the subgroup. In some embodiments, the metric may be utilized to determine a total weight of the connections in each subgroup or a minimum cost associated with producing the subgroup. In some embodiments, the metric may be utilized to perform sparse cuts or minimum cuts on the network representations of the entities and their relationships. Those skilled in the art can appreciate that other appropriate metrics may also be utilized to solve the network problem.

In some embodiments, formulating potential collusion among the entities as a vector space problem may comprise constructing vector space representations of the entities, grouping the vector space representations with similar anomalous patterns into clusters, and forwarding the clusters to a pattern analyzer for producing a second set of potentially colluding entities. In some embodiments, constructing vector space representations of the entities may further comprise constructing vectors representing click patterns of the entities. In some embodiments, the vectors may represent the click patterns of the entities with respect to time, frequency, gaps between clicks, keywords, or a combination thereof. In some embodiments, the vectors may also represent other patterns of interest associated with the entities. In some embodiments, the method may further comprise solving the vector space problem utilizing a metric, a mathematical function, or an algorithm. In some embodiments, the metric may be utilized to minimize a maximum standard deviation, a variance, a radius, or a median of each of the clusters. Those skilled in the art can appreciate that other appropriate metrics may also be utilized to solve the vector space problem.

In some embodiments, formulating potential collusion among the entities as a combination of the network problem and the vector space problem may comprise transforming the subgroups into vector spaces and performing clustering on eigen vectors of the vector spaces.

Modeling the collusion detection problem as a clustering problem on networks or vector spaces can provide many advantages. For example, embodiments disclosed herein can provide generality, flexibility and simplicity to click fraud detection. More specifically, embodiments disclosed herein can address many types of click fraud detection problems in a plug-and-play environment in which several graphs or several sets of vectors, each representing a different piece of information, can be easily constructed simultaneously. The graphs or vectors thus constructed can help with extracting different patterns.

In embodiments disclosed herein, clustering can provide highly accurate results, minimizing false positives and false negatives. With the clustering methods disclosed herein, various types of click fraud have been accurately detected.

Clustering in general is known to be computationally difficult to solve. We noticed that the networks corresponding to end users, online publishers, online referrers, etc. have special properties: they are very similar to social networks. We also recognized that vector space representations can offer powerful tools to analyze data. To reduce the computational cost of clustering, some embodiments disclosed herein integrate highly accurate, efficient, and scalable heuristics, including heuristics developed for social networks as well as heuristics developed for general clustering methods. For example, dimensionality reduction techniques such as principal component analysis (PCA) and singular value decomposition (SVD) may be utilized to improve the run of clustering.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
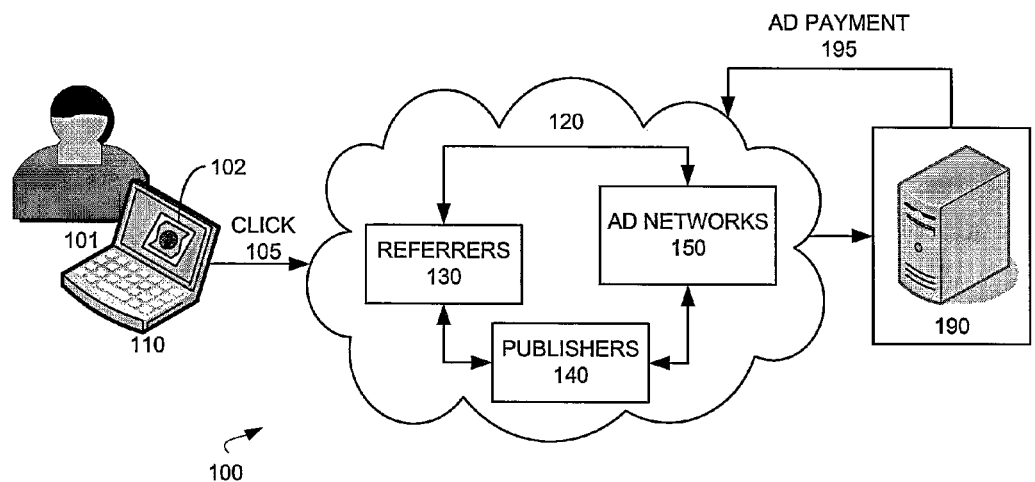
FIG. 1 depicts a diagrammatic representation of an example click transaction in a network environment.

The disclosure and the various features and advantageous details thereof are explained more fully with reference to the non-limiting embodiments that are illustrated in the accompanying drawings and detailed in the following description. Descriptions of well known hardware and software components, programming languages and programming techniques are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

FIG. 1 is a diagrammatic representation of an example click transaction in a network environment. Click transaction 100 may begin with user 101 clicking on online ad 102 via user device 110 at a particular Internet Protocol (IP) address and may end with advertiser 190 paying for that click via ad payment 195. Intermediaries 120 such as referrers 130, publishers and sub-publishers 140, and Ad networks 150 may make money from click 105—by charging a fee and/or sharing ad payment 195 for ad 102. For example, user 101 may visit a popular Internet search portal or Web site that is operated by referrer 130. Ad 102 may be a clickable link displayed on a Web page in the domain owned by referrer 130. Clicking on ad 102 may redirect a browser application running on user device 110 to an URL referencing a Web page published by publisher 140. Publisher 140 may be in Ad network 150, of which advertiser 190 may also be a member. The publisher's Web page residing at the particular URL may contain promotional information on a product mentioned in ad 102. Various techniques exist to track the identity of user 101. For example, in addition to redirecting the user's browser application to a publisher's server, a referrer's server may also send the publisher's server timestamps, cookies, user agents, or other information from user device 110 and/or user 101.

Broadly speaking, there are two types of click fraud: (1) publisher fraud and (2) competitor fraud. As mentioned earlier, collusion is a generic approach to commit these two types of fraud. If a fraudulent action involves a single IP address, referrer, publisher, or Ad network, it might not be difficult to catch as this single IP address, referrer, publisher, or Ad network can be readily identified by examining the amount of traffic involving the same IP address, referrer, publisher, or Ad network—which is abnormally high. It can be much harder to detect fraud when it is committed by multiple entities such as a group of referrers, a group of users with different IP addresses, or a mixture of users, referrers, etc. From a computational point of view, this results in an exponential search space, since a very large number of subsets would need to be enumerated.

Several types of entities may be involved in a click fraud: end users, referrers, publishers and sub-publishers, Ad networks, and advertisers. In some embodiments, vector spaces may be generalized to create signatures of various entities (multidimensional). These signatures can be monitored to see changing trends to detect collusion.

Figure 2:
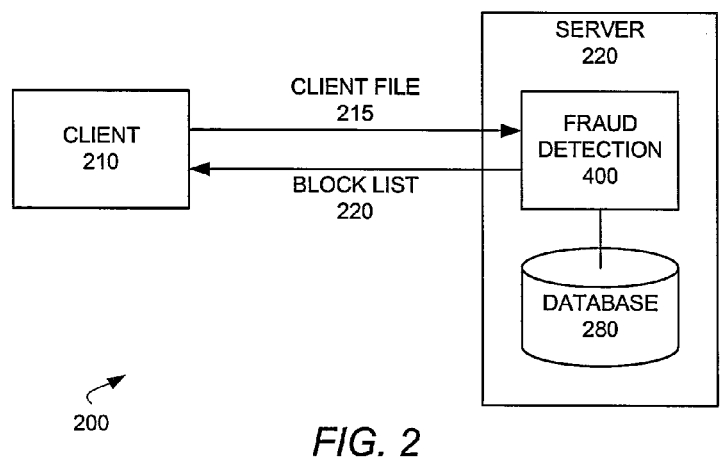
FIG. 2 depicts a diagrammatic representation of an example network architecture comprising a client and an embodiment of a collusion detection system.

FIG. 2 depicts a diagrammatic representation of an example network architecture comprising a client and an embodiment of a collusion detection system. Architecture 200 may comprise client site 210 and server site 220. Server site 220 may represent a computing environment comprising one or more server machines. Each server machine may include a central processing unit (CPU), read-only memory (ROM), random access memory (RAM), hard drive (HD) or non-volatile memory, and input/output (I/O) device(s). An I/O device may be a keyboard, monitor, printer, electronic pointing device (e.g., mouse, trackball, etc.), or the like. The hardware configuration of this server machine can be representative to other devices and computers alike at server site 220 as well as client site 210.

For the sake of simplicity, hardware components (e.g., CPU, ROM, RAM, HD, I/O, etc.) are not illustrated in FIG. 2. Embodiments disclosed herein may be implemented in suitable software code (i.e., computer instructions translatable by a processor). As one skilled in the art can appreciate, computer instructions and data implementing embodiments disclosed herein may be carried on various types of computer-readable storage media, including volatile and non-volatile computer memories and storage devices. Examples of computer-readable storage media may include ROM, RAM, HD, direct access storage device arrays, magnetic tapes, floppy diskettes, optical storage devices, etc. In an illustrative embodiment, the computer instructions may be written in Java® or any appropriate computer language. In embodiments disclosed herein, some or all of the software components may reside on a single server computer or on any combination of separate server computers. Communications between any of the computers described above may be accomplished in various ways, including wired and wireless. As one skilled in the art can appreciate, network communications can include electronic signals, optical signals, radio-frequency signals, and other signals as well as combinations thereof.

Architecture 200 may comprise a computer program product having one or more computer readable storage media storing computer instructions translatable by a processor to perform an embodiment of fraud detection 400. In some embodiments, server site 220 and client site 210 may represent enterprise computing environments owned and operated by different entities. For example, company A at server site 220 may provide click fraud detection services to company B at client site 210. In one embodiment, these entities may communicate over a network. In one embodiment, these entities may communicate over a secure channel in a public network such as the Internet.

In this simplified example, fraud detection software 400 running on one or more server machines (referred to herein as fraud detection system 400) at server site 220 may receive client file 215 from client site 210. As a specific example, the client may be an online retailer and may collect click stream data from visitors to a Web site own and/or operated by the online retailer. In some embodiments, client file 215 may be a Web log file or a file containing historical click data that can provide a detailed look at how each visitor got to the Web site, what pages were viewed by the visitor, what products and/or services the visitor clicked on, the date and time of each visit and click, and so on. The specific click stream data that can be collected from each click stream may include a variety of entities such as the Internet Protocol (IP) address associated with a visitor (which can be a human or a bot), timestamps indicating the date and time at which each request is made or click is generated, target URL or page and network address of a server associated therewith, user-agent (which shows what browser the visitor was using), query strings (which may include keywords searched by the visitor), and cookie data. For example, if the visitor found the Web site through a search engine, the corresponding click stream would generally contain the referrer page of the search engine and the search words entered by the visitor. Click stream data is generally created using a corporate information infrastructure that supports a Web-based enterprise computing environment. A skilled artisan can appreciate what typical click streams may contain and how they are generated and stored. Embodiments disclosed herein may extract one or more types of entities for further processing.

In one embodiment, fraud detection system 400 may receive client file 215 at a scheduled interval. For illustrative purposes, client file 215 may contain one million clicks within a given time period of one day, which, on average, may take about half an hour or less to process and generate block list 220.

More specifically, in some embodiments, fraud detection system 400 may operate to analyze client file 215, construct representations of entities contained in client file 215, perform clustering on the representations thus constructed, identify IP addresses that might indicate potential collusion, and send block list 220 containing the identified IP addresses to client site 210. In some embodiments, fraud detection system 400 may operate to apply one or more filters to further optimize block list 220 such as removing known false positives, etc. For example, database 280 which is accessible by fraud detection system 400 may maintain a list of verified or legitimate IP addresses. Fraud detection system 400 may utilize that list to validate the identified IP addresses, thus removing false positives and making the final list more accurate.

Figure 3:
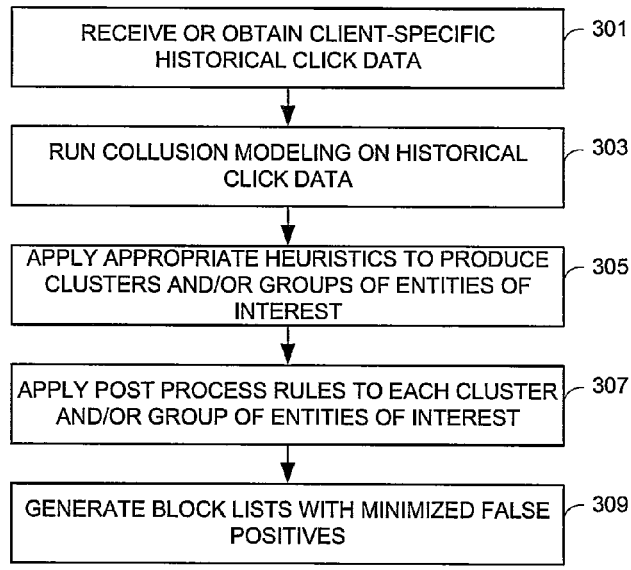
FIG. 3 depicts a flow diagram illustrating one example embodiment of a collusion detection process.
Figure 4:
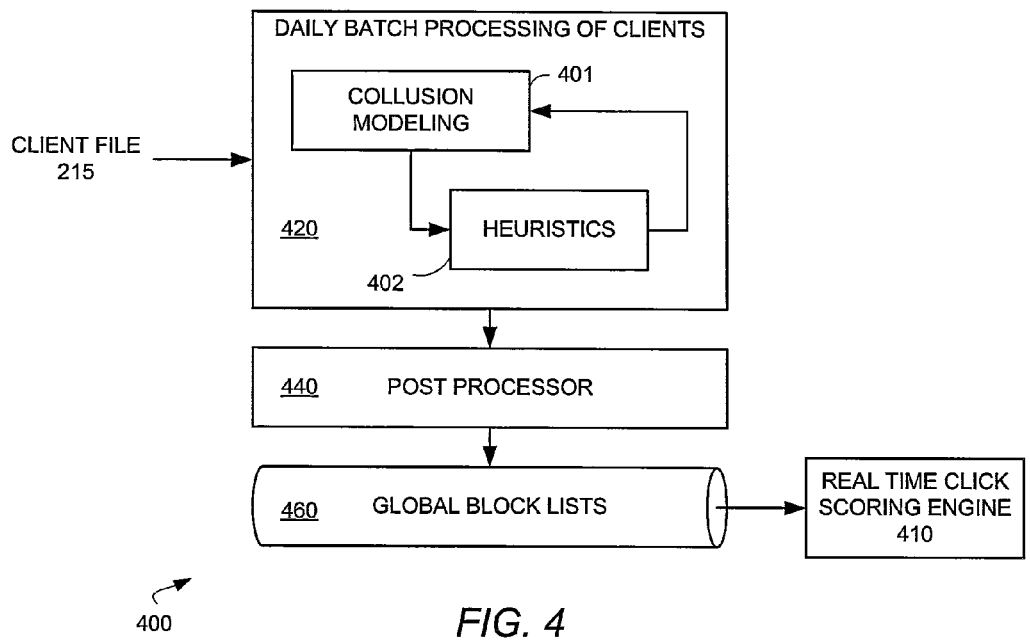
FIG. 4 depicts a diagrammatic representation of one example embodiment of a collusion detection system.

FIG. 3 depicts a flow diagram illustrating one example embodiment of collusion detection process 300 and FIG. 4 depicts a diagrammatic representation of one example embodiment of collusion detection system 400 implementing process 300. In some embodiments, at server site 220, historical click data may be received or obtained from a client (step 301). In some embodiments, client file 215 may contain historical click data. In some embodiments, fraud detection system 400 may comprise collusion modeling 401 for processing the historical click data received from client site 210 and generating clusters and/or high density subgraphs (step 303). In some embodiments, collusion modeling 401 may be implemented as a software module or system. Further details on collusion modeling 401 are described below.

In some embodiments, fraud detection system 400 may further comprise heuristics 402. Heuristics 402 may be applied to results from collusion modeling 401 to produce high density subgraphs and/or high dimensional clusters (step 305). In some embodiments, results from heuristics 402 may be provided to collusion modeling 401 in an iterative process. In some embodiments, collusion modeling 401 and heuristics 402 may operate on a daily basis as part of daily batch processing 420.

In some embodiments, fraud detection system 400 may further comprise post processor 440 for processing the high density subgraphs and/or high dimensional clusters from daily batch processing 420. In some embodiments, post processor 440 may apply post process rules to each cluster and/or group of entities of interest (step 307). An example of a primary function of post processor 440 would be to produce block lists while minimizing false positives (step 309). In some embodiments, these block lists may be client-specific. An example of a post process rule may filter out known legitimate IP addresses.

In some embodiments, fraud detection system 400 may further comprise storage location or database 460 for storing block lists, including block list 220 for client 210, generated by post processor 440. In some embodiments, block list storage location 460 is accessible by real time click scoring engine 410. In some embodiments, real time click scoring engine 410 may score each click in real time utilizing information stored on block list storage location 460.

In some embodiments, fraud detection system 400 may operate to build a framework based on the historical click data to capture the underlying information for collusion detection. In this framework, graphs and/or vector spaces that represent useful pieces of information may be built or otherwise constructed for a given client. To detect collusion (click fraud), each of these representations (a graph or a vector space) may be examined and analyzed as an optimization problem (a computational problem). As collusion detection may be modeled as a clustering problem with certain metrics, heuristics that are highly accurate and highly scalable for large data sets (clusters) may be developed and/or applied to identify IP addresses that indicate potential collusion.

In the context of fraud detection, certain types of patterns in the representations of information pertaining to collusion can be useful to mine. As an example, consider the problem of detecting collusion where a subgroup of referrers (possibly hundreds) and a subgroup of users or visitors (possibly several thousand) are involved in a scheme. Although the general traffic may look very normal, there are certain characteristics (or patterns) corresponding to these visitors and referrers that are distinct. For example, certain users may visit certain referrers more frequently than other referrers, their time or frequency of visits may be very similar (which is a characteristic of a click farm), and the type of search keywords may also appear to be very similar, etc. One approach to detect these patterns is to enumerate all the possible combinations. This approach is computationally infeasible, since there can be millions of visitors and thousands or hundreds of thousands of referrers.

In some embodiments, collusion modeling 401 may utilize a plurality of collusion modeling approaches, including a network modeling approach (see FIGS. 5-8) and a high dimensional vector space clustering modeling approach (see FIGS. 9-10), to capture the right information that is relevant to detect collusion and/or predict traffic quality (TQ). Implementing these modeling approaches, in some embodiments, collusion modeling 401 is operable to formulate (or model) various collusion detection and traffic quality prediction problems as network analysis or clustering problems. More specifically, collusion modeling 401 is operable to formulate, for each client, the analysis of groups of entities as graph partitioning or high dimensional vector space clustering problems to capture the groups of entities that look "abnormal." In the case of graphs, the notion of "abnormality" may be captured by densities, which, in some embodiments, can be defined by the number of edges and/or the number of nodes. In the case of clusters, the notion of "abnormality" may be captured by grouping entities with similar patterns—with respect to time, frequency, gaps between clicks, keywords, etc. These collusion modeling approaches will now be further described in detail.

Network Modeling

Figure 5:
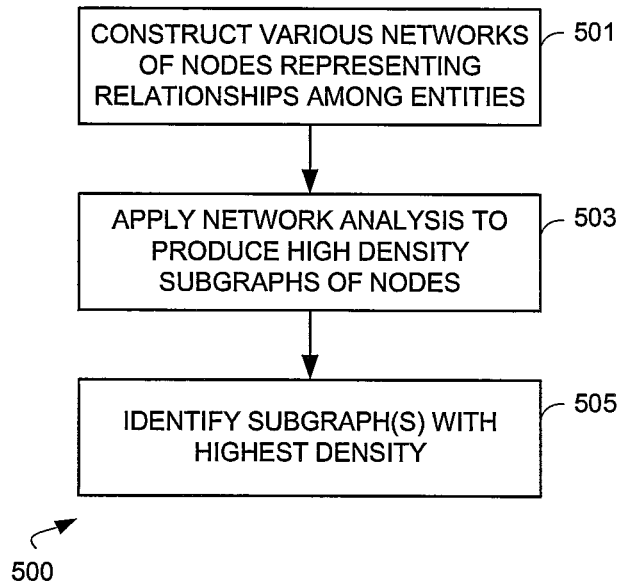
FIG. 5 depicts a flow diagram illustrating one example embodiment of a network modeling approach for collusion detection.

FIG. 5 depicts a flow diagram illustrating one example embodiment of network modeling approach 500 for collusion detection. In some embodiments, for each client, collusion modeling 401 may first construct various networks of nodes representing relationships among entities (step 501). Collusion modeling 401 may then operate to analyze the relationships to partition these nodes into high density subgraphs (step 503) and find a subset of nodes that have the highest density (step 505).

Within this disclosure, a graph is a mathematic representation of a network of entities and their relationships. It is denoted by G=(V, E), where V is a set of nodes and E is a set of edges that connect the nodes. A bipartite graph is a graph with two sets of nodes and edges that connect the nodes across the sets (not within the sets); it is represented by G=(V1, V2, E). In this network representation, nodes correspond to entities and edges correspond to the relationships between pairs of entities. In some embodiments, weights are attached to these edges to denote the strength of connections.

This network modeling approach can be easily generalized to any type of entities, allowing various types of relationships be examined to extract useful patterns, examples of which are briefly outlined as follows.

Consider a graph representing a network of nodes, each node corresponding to a publisher. Suppose two nodes are connected if the corresponding publishers share at least a given number (per a defined threshold) of IP addresses (IPs). Given such a network, a high density subgraph may correspond to potential publisher collusion, since it is highly unusual that these publishers are being visited by the same IPs.

As another example of detecting botnets, a graph representing an IP to IP network may be constructed such that two nodes are connected if they visit the same referrers or use the same keywords, etc.

As yet another example, consider the detection of collusion among referrers of a given publisher and their visitors. Intuitively, one of the patterns exhibited by collusion is a subset of visitors frequently visiting the same referrers. Detection of such type of behavior can be modeled as follows.

Figure 6:
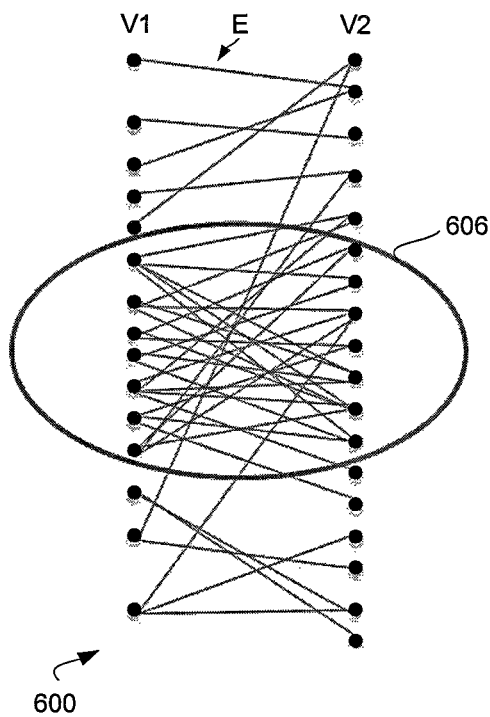
FIG. 6 depicts a diagrammatic representation of one example of a bipartite graph.

FIG. 6 depicts a diagrammatic representation of one example of a bipartite graph. As illustrated in FIG. 6, bipartite graph 600 may be represented by G=(V1, V2, E). In this example, nodes in V1 correspond to visitors (entities of a first type) and nodes in V2 correspond to referrers (entities of a second type). Each edge E between a node in V1 and a node in V2 indicates a visitor, represented by the corresponding node in V1, visiting a particular referrer, represented by the corresponding node in V2. In some embodiments, the edges are weighted. In some embodiments, weights can be the number of clicks. For example, an edge may connect a visitor node with a referrer node if an IP address associated with the visitor node visits the same referrer at least five times during a certain defined period of time. Other implementations are also possible. As a specific example, area 606 in bipartite graph 600 shows that of all the nodes in V1 and V2, a certain subset of visitors appear to visit a certain subset of referrers frequently.

Figure 7A:
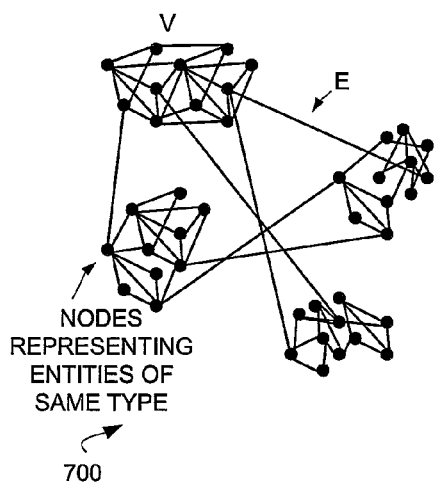
FIG. 7A depicts a diagrammatic representation of an example graph constructed from a bipartite graph.
Figure 7B:
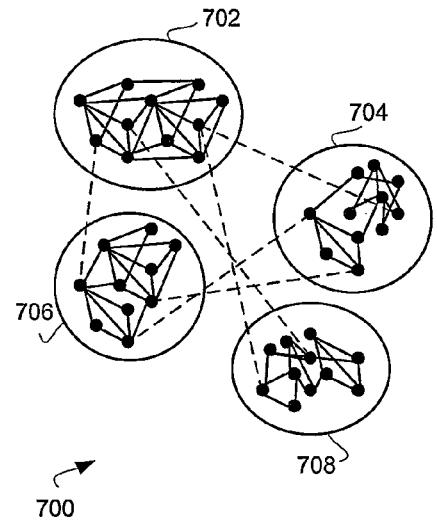
FIG. 7B depicts a diagrammatic representation of the graph of FIG. 7A after the network analysis of FIG. 5.

FIG. 7A is a diagrammatic representation of one embodiment of an example graph constructed from a bipartite graph. As illustrated in FIG. 7A, graph 700 may be represented by G=(V, E). In this example, nodes in V correspond to referrers. Each edge E between two nodes indicates that the corresponding referrers share a number of visitors. In some embodiments, the edges can be weighted. In some embodiments, weights may correspond to a number of visits. In some embodiments, weights may correspond to a number of common visitors. In some embodiments, weights may correspond to the amount of ad revenue. Other implementations are also possible. For example, an edge may connect two nodes if they share at least ten distinct visitors' IP addresses. FIG. 7B is a diagrammatic representation of one embodiment of an example graph having anomalous patterns. In this example, anomalous patterns in graph 700 are represented by subgraphs 702, 704, 706, 708, each of which may have a significantly higher number of connections than other subgraphs of same size. In some embodiments, certain connections (edges) and/or nodes may be filtered out as they may be statistically insignificant (represented by dotted lines). For example, IP addresses with low volumes of clicks may be removed from further consideration.

Figure 8:
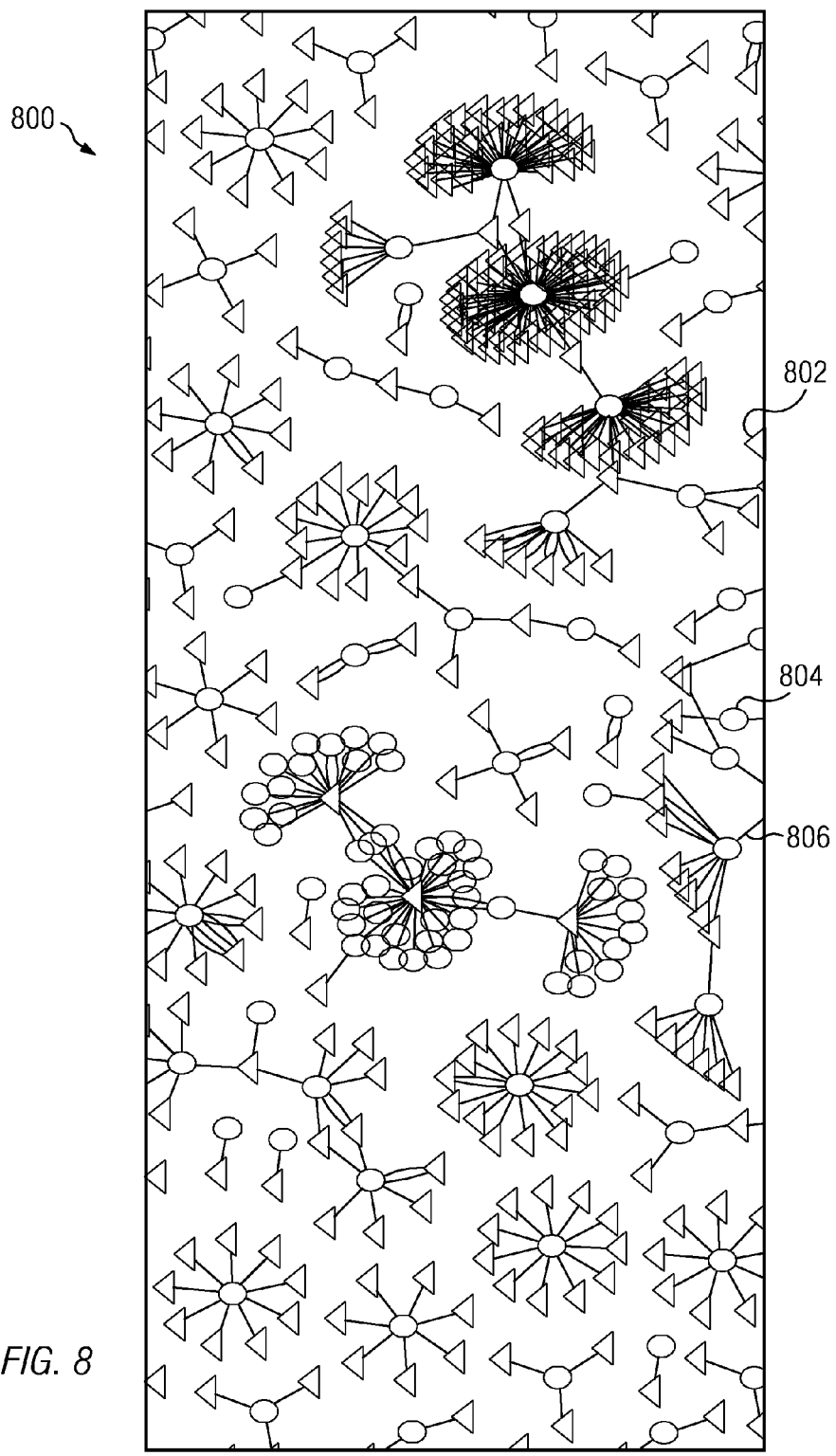
FIG. 8 depicts a diagrammatic representation of another example bipartite graph, showing high density subgraphs.

FIG. 8 depicts a diagrammatic representation of another example bipartite graph, showing high density subgraphs. In this example, bipartite graph 800 may be represented by G=(V1, V2, E), where nodes in V1 correspond to entities of a first type (802) and nodes in V2 correspond to entities of a second type (804). For example, entities 802 may comprise IP addresses and entities 804 may comprise domains. Each connection 806 may represent a link or association, perhaps weighted, between an IP address and a domain. High density subgraphs may be generated from bipartite graph 800 in a similar manner as described above with reference to FIGS. 7A and 7B.

Since these high density subgraphs may suggest potential collusion, the graph framework as described above can offer a broad approach to analyze relationships to detect collusion. For example, in some embodiments, a graph may be partitioned into k subgraphs to maximize the number of connections in each subgraph. Various metrics can be used to perform partitioning and produce high density subgraphs. Example metrics may include: density, total weight, low cost cuts (a set of edges that disconnect the graph into subgraphs), sparse cuts, min-cuts, etc. Some of the well known graph partitioning problems that are relevant in the context of collusion may include:

1. Min-k cut, ratio cuts that aim at partitioning the graph into high density subgraphs.

2. K-dense subgraphs (find the densest subgraph of k nodes).

3. Densest k-subgraph.

Graph partitioning problems have been well studied in the literature and thus are not further described herein.

High Dimensional Vector Space Clustering Modeling

Figure 9:
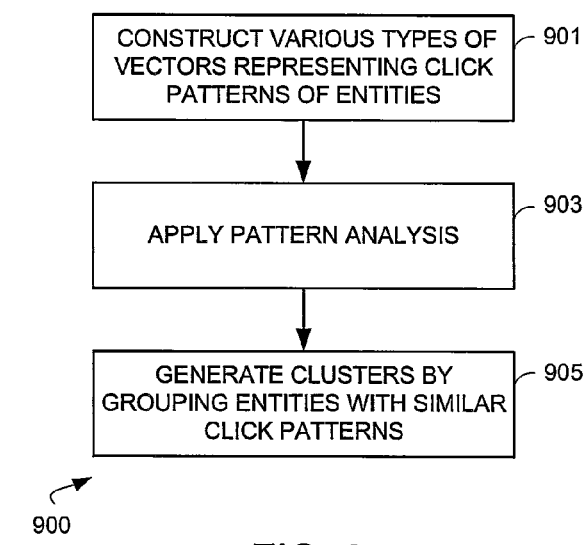
FIG. 9 depicts a flow diagram illustrating one example embodiment of a high dimensional vector space clustering modeling approach for collusion detection.

FIG. 9 depicts a flow diagram illustrating one example embodiment of high dimensional vector space clustering modeling approach 900 for collusion detection. In some embodiments, for each client, collusion modeling 401 may construct various types of vectors representing click patterns of entities (step 901). Collusion modeling 401 may then operate to analyze these vectors to find similar patterns with respect to time, frequency, gaps between clicks, keywords selected, etc. (step 903) and generate clusters by grouping entities with similar patterns (step 905). Examples of anomalous patterns may include:

Click activity times (usually exhibited by humans);
Frequency of clicks in a given period of time (usually exhibited by bots); and
The gaps between consecutive clicks (usually exhibited by humans).

As an example, collusion modeling 401 may construct time series vectors for each referrer and IP combination (in the vector space model). Here, the time series vectors represent clicking patterns, so if a subset of these entities have similar time series, it may represent referrer and IP collusion. Collusion modeling 401 may then formulate this as a high dimensional clustering problem.

Essentially, a vector is an array of real numbers—a signature of some sort. The length of the array is the dimensionality of the vector. Alternatively, each vector can be thought of as a point in some high dimensional space. In the vector space model, similarity of two vectors can be measured using distance norms, and $L_1$, $L_2$ and $L\_inf$ are the most useful norms. In many practical applications, the number of dimensions is huge. When input data involves a large number of real attributes, vector spaces may be a more suitable representation than graphs, since they preserve more information. For example, in click farms, humans are employed to click on the ads. Assuming certain types of click farms exhibit similar clicking behavior, this type of fraud may be detected by analyzing time patterns associated with the clicks.

Let T denote the time period of the data. T is divided into buckets $B_i$, representing a time slot. (Note that these buckets $B_i$ need not be uniform). For each visitor (or referrer or publisher), measure the volume of traffic coming into $B_i$. Thus, for each IP there corresponds a time series vector of high dimensions. The probability of a group of IP addresses having very similar clicking patterns across a given time period is usually very small and is an indication of anomalous activity. Detection of groups of IP addresses that have similar clicking patterns in the time domain can be modeled as a clustering problem. Many well known clustering methods can then be used to identify "interesting" IP addresses.

An example method for detecting visitors or referrers that have similar anomalous patterns may comprise dividing a time period into time slots (T). This time period may represent a defined length of time during which network traffic is monitored by a system implementing an embodiment disclosed herein. A graph (G) can then be constructed by analyzing click activities in these time slots. For example, let $G=(V, E)$ denote the network of user devices at various IP addresses. Here, two nodes are connected if the corresponding IP addresses share a number of time slots, meaning they are active in these time slots. In some cases, there might be noise in G. Such noise may be removed or otherwise reduced utilizing filters. For example, a filter may be utilized to remove known cluster(s) of IP addresses. This may be an optional step. Given such a graph, anomalous time patterns can be identified by finding subgraph(s) containing a large number of connections.

The above time series analysis analyzes click patterns in time. A frequency analysis may identify anomalous frequency patterns even if they are shifted in time. For example, bots may start at different times but may have very similar frequency of clicking in a given period of time. In some embodiments, this type of fraud may be detected by analyzing frequency patterns associated with the clicks.

Figure 10:
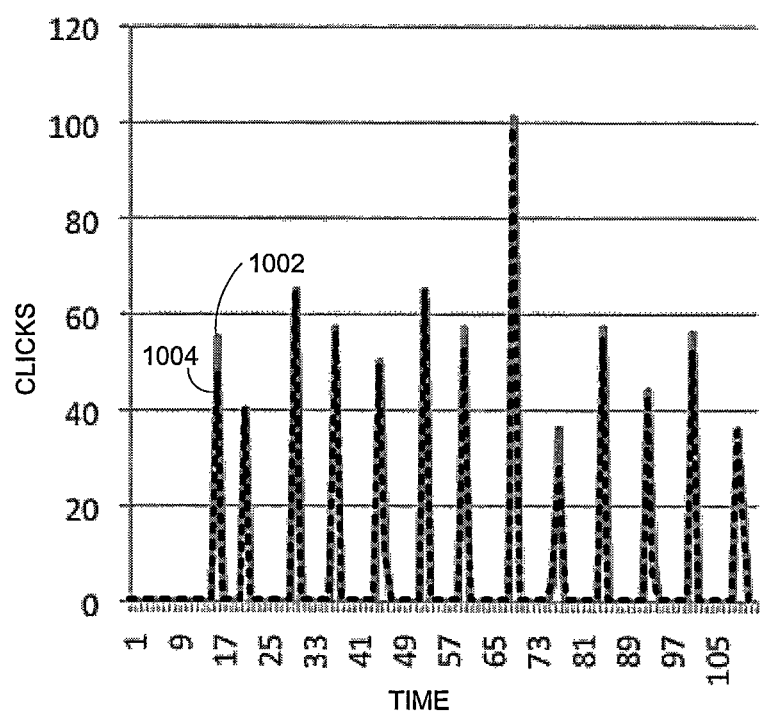
FIG. 10 depicts a plot diagram exemplifying one example of two entities having similar frequency patterns in a given period of time.

FIG. 10 depicts a plot diagram exemplifying one example of two entities having similar frequency patterns in a given period of time. In this example, it can be seen from plot 1000 that frequency series 1002 and 1004, each corresponding to a particular IP address, share a number of frequency slots and have very similar frequency patterns, indicating potential collusion. In this case, the frequencies of clicks from individual IP addresses may be obtained by performing Fast Fourier Transformation on each time slot T. Thresholds may be used to filter out some frequencies. For example, post processor 440 may remove from consideration IP addresses with fewer than five clicks in a given period of time. This step may be optional. Now let $G=(V, E)$ denote the network of IP addresses where two nodes in V are connected via E to indicate that the corresponding IP addresses share a number of frequency slots. Given such a graph, a subgraph containing a large number of connections represents IP addresses with very similar frequency patterns may be identified as an indication of potential collusion.

In some cases, in order to evade detection, a bot or human may change its click times—shifting the click times by some amount. However, the frequency of clicking may not change much, if it is the same bot or human. In such cases, the time domain vectors can be transformed into frequency domain vectors and clustering can be performed on them. Again, the probability of a group of IP addresses having very similar frequency patterns is very low—in fact, it reduces as the number of dimensions increases—and is an indication of anomalous activity.

In addition to the time series analysis and the frequency series analysis, in some embodiments, gaps between consecutive clicks can be divided into gap slots and analyzed as described above. Similar to time buckets, vectors of gaps can also be constructed. First, find the maximum possible gap between clicks and divide a given time period into buckets. For each IP address and for each bucket, measure the volume of clicks. This results in a multidimensional vector for each IP address. Perform clustering on these vectors to find IP addresses that have similar gap vectors. As a specific example, for each visitor at a particular IP address (or referrer or publisher), divide a given time period of, say, two weeks, into time buckets of, say, 1 hour. This results in a 128 dimensional vector for each IP address.

Suitable clustering methods that can be performed on multidimensional vectors may include k-means (minimizes the maximum standard deviation of each cluster), k-center (minimizes the maximum radius of each cluster), k-median, and different metrics of hierarchical (single linkage, double linkage, etc).

The best known algorithms that can optimally solve these problems are known to take exponential time. To reduce the computational cost of clustering, some embodiments disclosed herein integrate highly accurate, efficient, and scalable heuristics, including heuristics developed for social networks as well as heuristics developed for general clustering methods. These heuristics work well in practice. Examples of suitable heuristics may include:

1. Combinatorial approaches such as greedy approaches.
2. Linear programming approaches.

3. Spectral methods that convert the graphs into vector space models. First, the Laplacian of the graph is constructed. Then, the eigen vectors of these Laplacians are determined, one eigen vector corresponding to each node. Clustering on these Eigen vectors is a good approximation of clustering on the corresponding graphs—since it is a relaxation of the integer quadratic program. Various well-known clustering algorithms can be applied on these eigen vectors where for each node there corresponds an eigen vector using the Laplacian of the graph.
4. Singular value decomposition (SVD) may be utilized to significantly reduce the data size via low rank approximation. More specifically, SVD also converts a bipartite graph into a vector space model. Consider a bipartite graph G=(V1, V2, E), where V1 corresponds to referrers and V2 corresponds to visitors with distinct IP addresses. In this case, there are no edges between any pair of referrers or any pair of IP addresses. The SVD technique is used in latent semantic indexing (LSI) of document classification in which two documents are considered similar if they share a lot of keywords. Here, the bipartite graph between documents and terms is decomposed into three matrices, D, T and S, where D is the document concept matrix, T is the term concept matrix, and S is a diagonal matrix of singular values. Clustering on D provides document classification and clustering on T provides term classification. Utilizing this technique, in some embodiments, two referrers are considered similar if they share a lot of visitors (IP addresses). Similarly, two IP addresses are similar if they share a lot of referrers. Referrer and visitor matrices can then be obtained by decomposing the bipartite graph between them. Using any standard k-means, k-center clustering methods on these matrices can generate clusters of highly related items. Further analysis on these clusters can be done to detect potential collusions.

The last two approaches transform the graphs into vector spaces and clustering is performed on eigen vectors. Other dimensionality reduction techniques such as principal component analysis (PCA) may also be utilized to improve the run of clustering as well as to reduce the noise.

The collusion modeling described above can provide a powerful tool that can generate various types of models relevant for detecting collusion. Those skilled in the art will appreciate that embodiments of the collusion modeling disclosed herein are not limited to the aforementioned models. It is designed in a flexible and plug-and-play environment and can be easily updated to include new models to capture the new types of collusion. Furthermore, it can be tuned (or parameterized for each client). For example, in some embodiments, collusion modeling 401 may comprise a client specific configuration file containing various features which may include (1) types of networks; (2) types of vectors; (3) tuning parameters; and (4) formulations of network analysis and/or vector analysis problems.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A computer-implemented method for modeling collusion detection, comprising:

at a server computer in an enterprise computing environment:

receiving historical click data from a client computer connected to the enterprise computing environment over a network connection, wherein the historical click data comprises a plurality of clicks generated over a period of time and information associated with the plurality of clicks, and wherein the information comprises visitor Internet Protocol (IP) address information, date and time information, publisher information, referrer information, user-agent information, searched keywords, and cookie;

extracting entities of interest of one or more types from the historical click data;

formulating potential collusion among the entities as a network problem, a vector space problem, or a combination thereof;

wherein formulating potential collusion among the entities as a network problem comprises:

constructing network representations of the entities and their relationships, wherein the entities are represented by nodes and wherein their relationships are represented by connections between the nodes;

partitioning the network representations into subgroups of nodes to maximize a number of connections between the nodes in each subgroup;

forwarding the subgroups to a network analyzer for producing a first set of potentially colluding entities;

wherein formulating potential collusion among the entities as a vector space problem comprises:

constructing vector space representations of the entities, wherein the vector space representations comprise vectors representing click patterns of the entities;

grouping the vector space representations with similar anomalous patterns into clusters; and forwarding the clusters to a pattern analyzer for producing a second set of potentially colluding entities; and wherein formulating potential collusion among the entities as a combination of the network problem and the vector space problem comprises:

transforming the subgroups of nodes from the network problem into vector spaces; and performing clustering on eigen vectors of the vector spaces to produce a third set of potentially colluding entities; and identifying, from the first set of potentially colluding entities, the second set of potentially colluding entities, or the third set of potentially colluding entities, one or more groups of entities having a degree of collusion corresponding to an organized activity on the Internet.

2. The method according to claim 1, further comprising solving the network problem utilizing a metric.

3. The method according to claim 2, wherein the metric is utilized to determine a density of each subgroup, wherein the density of the subgroup is defined by the number of connections in the subgroup divided by the number of nodes in the subgroup, and wherein the density of the subgroup corresponds to a degree of collusion of the entities represented by the nodes in the subgroup.

4. The method according to claim 2, wherein the metric is utilized to determine a total weight of the connections in each subgroup.

5. The method according to claim 2, wherein the metric is utilized to determine a minimum cost associated with producing the subgroup.

6. The method according to claim 2, wherein the metric is utilized to perform sparse cuts or minimum cuts on the network representations of the entities and their relationships.

7. The method according to claim 1, further comprising solving the vector space problem utilizing a metric.

8. The method according to claim 7, wherein the metric is utilized to minimize a maximum standard deviation, a variance, a radius, or a median of each of the clusters.

9. The method according to claim 1, wherein the vectors represent the click patterns of the entities with respect to time, frequency, gaps between clicks, keywords, or a combination thereof.

10. A computer program product comprising one or more non-transitory computer-readable storage media storing computer instructions translatable by a processor in an enterprise computing environment to perform:
receiving historical click data from a client computer connected to the enterprise computing environment over a network connection, wherein the historical click data comprises a plurality of clicks generated over a period of time and information associated with the plurality of clicks, and wherein the information comprises visitor Internet Protocol (IP) address information, date and time information, publisher information, referrer information, user-agent information, searched keywords, and cookie;
extracting entities of interest of one or more types from the historical click data;
formulating potential collusion among the entities as a network problem, a vector space problem, or a combination thereof;
wherein formulating potential collusion among the entities as a network problem comprises:
constructing network representations of the entities and their relationships, wherein the entities are represented by nodes and wherein their relationships are represented by connections between the nodes;
partitioning the network representations into subgroups of nodes to maximize a number of connections between the nodes in each subgroup;
forwarding the subgroups to a network analyzer for producing a first set of potentially colluding entities;
wherein formulating potential collusion among the entities as a vector space problem comprises:
constructing vector space representations of the entities, wherein the vector space representations comprise vectors representing click patterns of the entities;
grouping the vector space representations with similar anomalous patterns into clusters; and
forwarding the clusters to a pattern analyzer for producing a second set of potentially colluding entities; and
wherein formulating potential collusion among the entities as a combination of the network problem and the vector space problem comprises:
transforming the subgroups of nodes from the network problem into vector spaces; and
performing clustering on eigen vectors of the vector spaces to produce a third set of potentially colluding entities; and
identifying, from the first set of potentially colluding entities, the second set of potentially colluding entities, or the third set of potentially colluding entities, one or more groups of entities having a degree of collusion corresponding to an organized activity on the Internet.

11. The computer program product of claim 10, further comprising computer instructions translatable by the processor to solve the network problem utilizing a metric.

12. The computer program product of claim 11, wherein the metric is utilized to:
determine a density of each subgroup, wherein the density of the subgroup is defined by the number of connections in the subgroup divided by the number of nodes in the subgroup, and wherein the density of the subgroup corresponds to a degree of collusion of the entities represented by the nodes in the subgroup;
determine a total weight of the connections in each subgroup;
determine a minimum cost associated with producing the subgroup;
perform minimum cuts on the network representations of the entities and their relationship; or
perform sparse cuts on the network representations of the entities and their relationships.

13. The computer program product of claim 10, further comprising computer instructions translatable by the processor to solve the vector space problem utilizing a metric.

14. The computer program product of claim 13, wherein the metric is utilized to minimize a maximum standard deviation, a variance, a radius, or a median of each of the clusters.

15. The computer program product of claim 10, wherein the vectors represent the click patterns of the entities with respect to time, frequency, gaps between clicks, keywords, or a combination thereof.

16. A system for modeling collusion detection, comprising:
a server computer; and
one or more non-transitory computer-readable storage media accessible by the server computer and storing computer instructions translatable by a processor of the server computer to perform:
receiving historical click data from a client computer communicatively connected to the server computer, wherein the historical click data comprises a plurality of clicks generated over a period of time and information associated with the plurality of clicks, and wherein the information comprises visitor Internet Protocol (IP) address information, date and time information, publisher information, referrer information, user-agent information, searched keywords, and cookie;
extracting entities of interest of one or more types from the historical click data;
formulating potential collusion among the entities as a network problem, a vector space problem, or a combination thereof;
wherein formulating potential collusion among the entities as a network problem comprises:
constructing network representations of the entities and their relationships, wherein the entities are represented by nodes and wherein their relationships are represented by connections between the nodes;
partitioning the network representations into subgroups of nodes to maximize a number of connections between the nodes in each subgroup;
forwarding the subgroups to a network analyzer for producing a first set of potentially colluding entities;

wherein formulating potential collusion among the entities as a vector space problem comprises:
  constructing vector space representations of the entities, wherein the vector space representations comprise vectors representing click patterns of the entities;
  grouping the vector space representations with similar anomalous patterns into clusters; and
  forwarding the clusters to a pattern analyzer for producing a second set of potentially colluding entities; and
wherein formulating potential collusion among the entities as a combination of the network problem and the vector space problem comprises:
  transforming the subgroups of nodes from the network problem into vector spaces; and
performing clustering on eigen vectors of the vector spaces to produce a third set of potentially colluding entities; and
identifying, from the first set of potentially colluding entities, the second set of potentially colluding entities, or the third set of potentially colluding entities, one or more groups of entities having a degree of collusion corresponding to an organized activity on the Internet.

17. The system of claim 16, wherein the network problem is solved utilizing a metric.

18. The system of claim 17, wherein the metric is utilized to:
  determine a density of each subgroup, wherein the density of the subgroup is defined by the number of connections in the subgroup divided by the number of nodes in the subgroup, and wherein the density of the subgroup corresponds to a degree of collusion of the entities represented by the nodes in the subgroup;
  determine a total weight of the connections in each subgroup;
  determine a minimum cost associated with producing the subgroup;
  perform minimum cuts on the network representations of the entities and their relationship; or
  perform sparse cuts on the network representations of the entities and their relationships.

19. The system of claim 16, wherein the vector space problem is solved utilizing a metric.

20. The system of claim 19, wherein the metric is utilized to minimize a maximum standard deviation, a variance, a radius, or a median of each of the clusters.

21. The system of claim 16, wherein the vectors represent the click patterns of the entities with respect to time, frequency, gaps between clicks, keywords, or a combination thereof.

* * * * *

UNITED STATES PATENT AND TRADEMARK OFFICE
CERTIFICATE OF CORRECTION

| | | |
|---|---|---|
| PATENT NO. | : 8,533,825 B1 | Page 1 of 1 |
| APPLICATION NO. | : 12/700053 | |
| DATED | : September 10, 2013 | |
| INVENTOR(S) | : Marsa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Twenty-seventh Day of January, 2015

Michelle K. Lee
*Deputy Director of the United States Patent and Trademark Office*